(12) United States Patent
  Koehler

(10) Patent No.: US 8,469,138 B1
(45) Date of Patent: Jun. 25, 2013

(54) PEDAL CONTROL SYSTEM FOR A VEHICLE

(75) Inventor: Adam J. Koehler, Peosta, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/432,754

(22) Filed: Mar. 28, 2012

(51) Int. Cl.
  *B60K 26/00* (2006.01)
(52) U.S. Cl.
  USPC ................................ 180/315; 74/512; 74/513
(58) Field of Classification Search
  USPC ................ 180/315, 326, 335, 336; 74/512, 74/513
  See application file for complete search history.

(56) References Cited

U.S. PATENT DOCUMENTS

| | | | |
|---|---|---|---|
| 3,505,896 A * | 4/1970 | Phillips | 74/481 |
| 5,529,134 A * | 6/1996 | Yomogita | 180/6.2 |
| 6,883,633 B2 * | 4/2005 | Schroeder et al. | 180/336 |
| 8,225,902 B2 * | 7/2012 | Kiviahde et al. | 180/315 |
| 2011/0083527 A1 * | 4/2011 | Osawa et al. | 74/513 |

\* cited by examiner

*Primary Examiner* — Eric Culbreth

(57) ABSTRACT

A vehicle including a plurality of ground engaging propulsion devices and two foot actuated controls. The plurality of ground engaging propulsion devices include a first and a second ground engaging propulsion device. The first ground engaging propulsion device is associated with one side of the vehicle and the second ground engaging propulsion device is associated with an opposite side of the vehicle. The two foot actuated controls include a first and a second foot actuated control. The first foot actuated control is controlingly connected to the first ground engaging propulsion device. The second foot actuated control is controlingly connected to the second ground engaging propulsion device. The first foot actuated control includes a pedal, a footrest and a peg. The pedal is pivotally connected to the vehicle. The footrest extends from a side of the foot actuated control. The peg extends from the side of the pedal.

20 Claims, 5 Drawing Sheets ial control of movement of the vehicle. The pedal is connected to the vehicle.

PEDAL CONTROL SYSTEM FOR A VEHICLE

FIELD OF THE INVENTION

The present invention relates to a pedal control system for use with an agricultural harvester, and, more particularly, to a pedal control system for use with forestry machinery.

BACKGROUND OF THE INVENTION

Forestry machines in the form of a feller/buncher have a felling head on the front end of the machine with a cutting device at the bottom of the felling head. The cutting device, for example, may be in the form of shears, a disk saw, or a chainsaw. A feller/buncher has articulated fingers that grasp the trees as they are being cut and are used for the purpose of positioning the trees at a desired location on the ground. This is accomplished by the power and dexterity of the feller/buncher.

The operator controls the movement of the tracks or wheels on the ground by utilizing two foot pedals, with the two foot pedals respectively controlling opposite sides of the vehicle. The terrain over which the feller/buncher travels is notably rough causing the forestry machinery to pitch in various directions. The movement of the vehicle causes the operator's foot to also shift causing a natural reaction relative to the placement of the feet on the pedal, which can cause the forestry machinery to move in a less than desirable manner. The dexterity of the operator's hands allows for the control of the saw head connected to the boom so that use of the feet for movement of the machine overall is a particular advantage.

The problem with the current pedal system is that the operator can inadvertently send commands for movement of the vehicle due to the change in attitude of the vehicle as the vehicle traverses uneven terrain. What is needed in the art is a simple efficient way of reducing or precluding this unnecessary movement of the forestry vehicle.

SUMMARY

The present invention provides an alternate position for the feet of a feller/buncher operator as the operator interacts with the foot control pedals.

The invention in one form is directed to a forestry vehicle including a plurality of ground engaging propulsion devices and two foot actuated controls. The plurality of ground engaging propulsion devices include a first ground engaging propulsion device and a second ground engaging propulsion device. The first ground engaging propulsion device is associated with one side of the vehicle and the second ground engaging propulsion device is associated with an opposite side of the vehicle. The two foot actuated controls include a first foot actuated control and a second foot actuated control. The first foot actuated control is controlingly connected to the first ground engaging propulsion device. The second foot actuated control is controlingly connected to the second ground engaging propulsion device. The first foot actuated control includes a pedal, a footrest and a peg. The pedal is pivotally connected to the vehicle. The footrest extends from a side of the foot actuated control. The peg extends from the side of the pedal.

The invention in another form is directed to a method of controlling movement of a vehicle including the steps of controlingly connecting a first foot actuated control to a first ground engaging propulsion device of the vehicle and a second foot actuated control to a second ground engaging propulsion device of the vehicle. The first foot actuated control has a pedal, a footrest and a peg. The pedal is pivotally connected to the vehicle. The footrest extends from a side of the foot actuated control. The peg extends from the side of the foot pedal. The method also includes the step of encountering a combination of the footrest and the peg by a foot of an operator to cause the vehicle to move.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION

Figure 1:
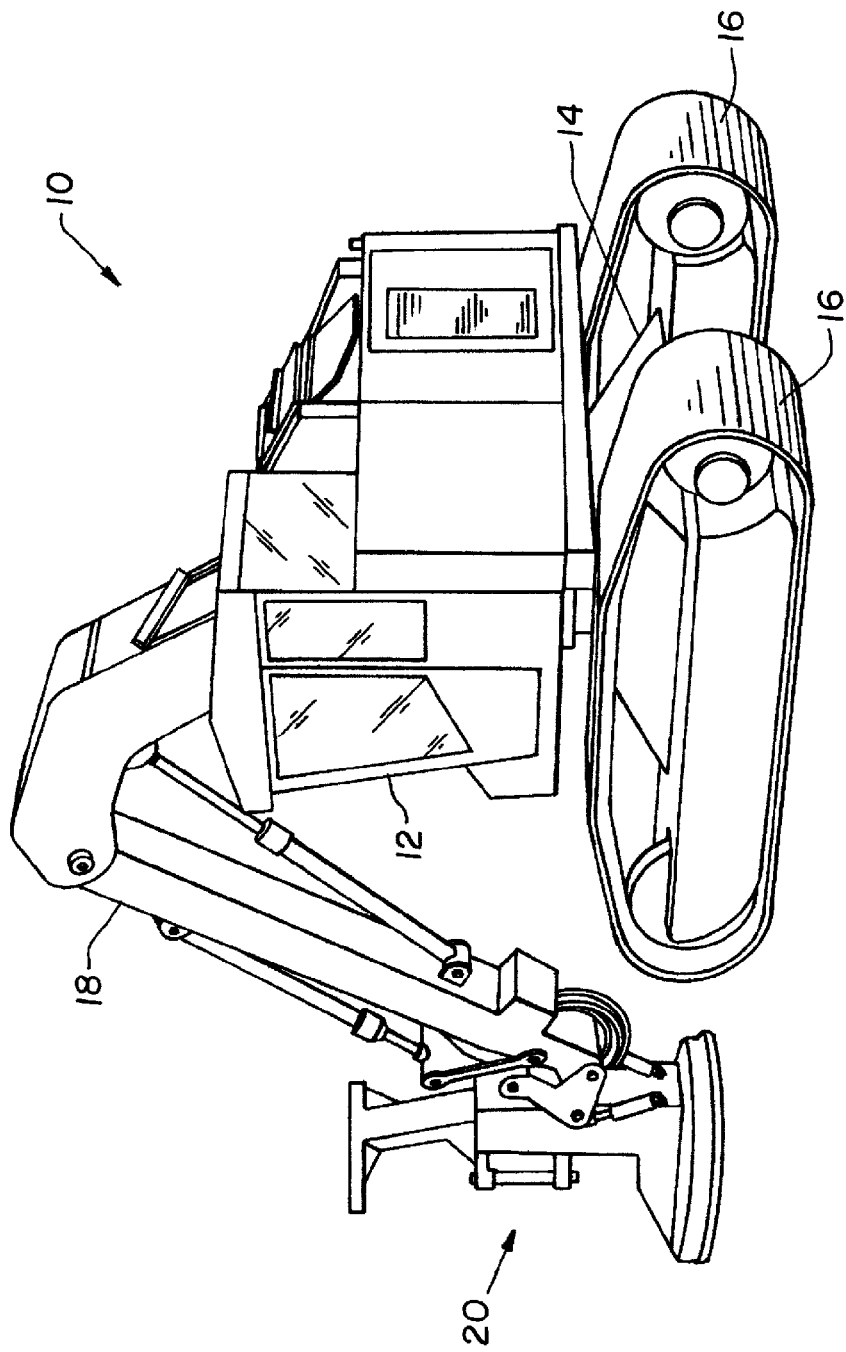
FIG. 1 is a perspective view of a forestry machine including an embodiment of the control system of the present invention.
Figure 2:
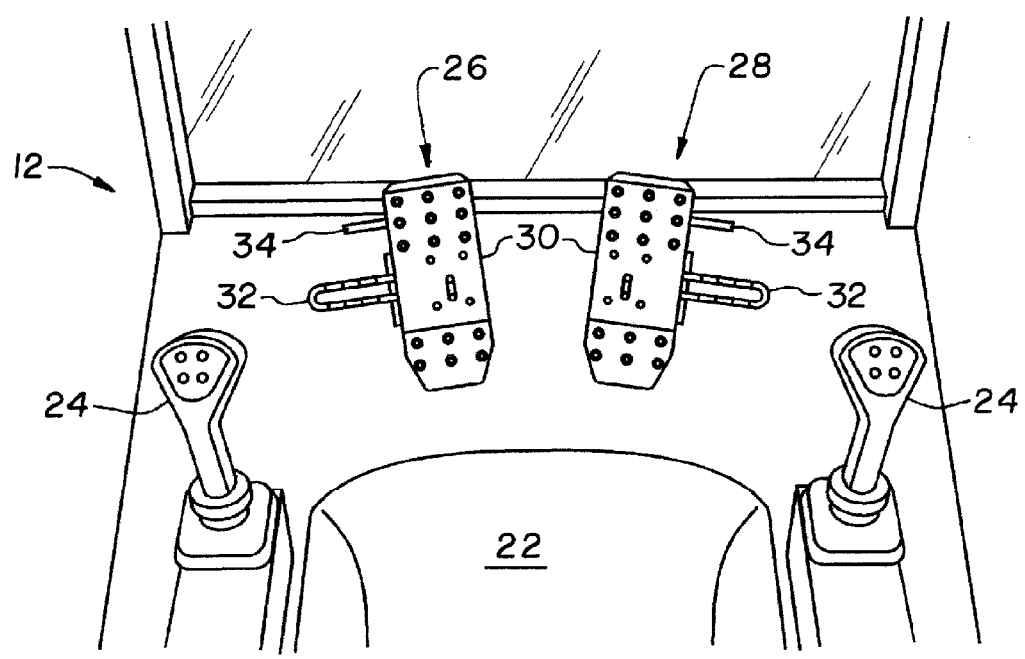
FIG. 2 is a perspective view from an operator view point of an embodiment of the foot actuated controls of the forestry vehicle of FIG. 1.
Figure 3:
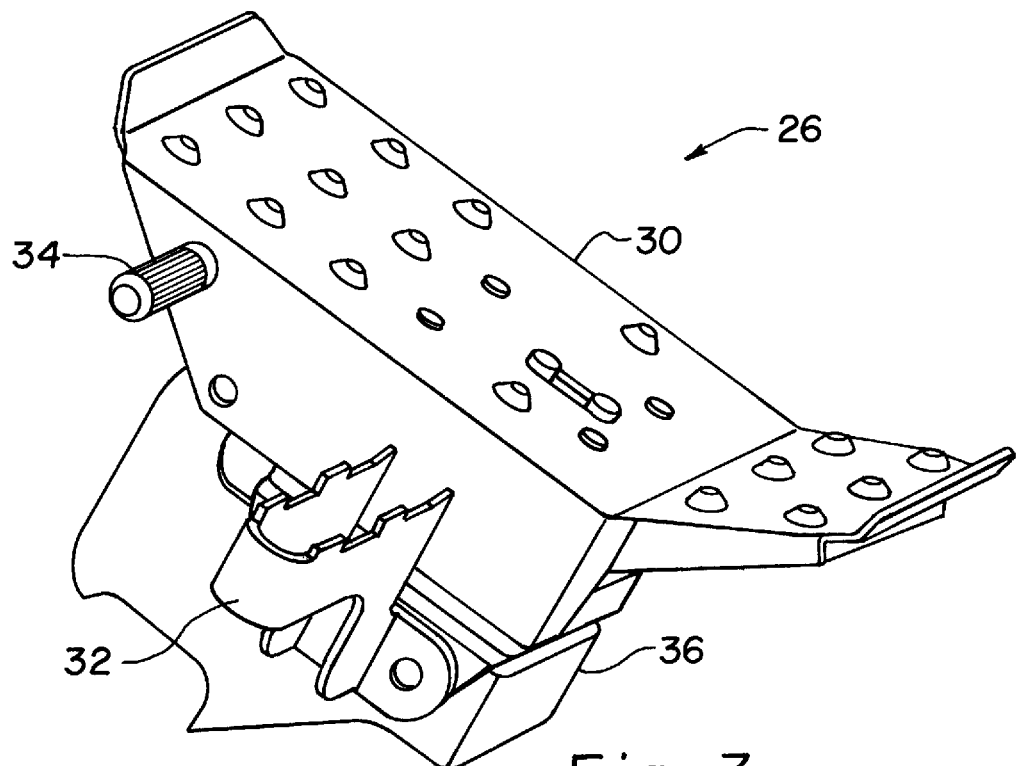
FIG. 3 is a perspective view of one of the foot actuated controls of FIG. 2.
Figure 4:
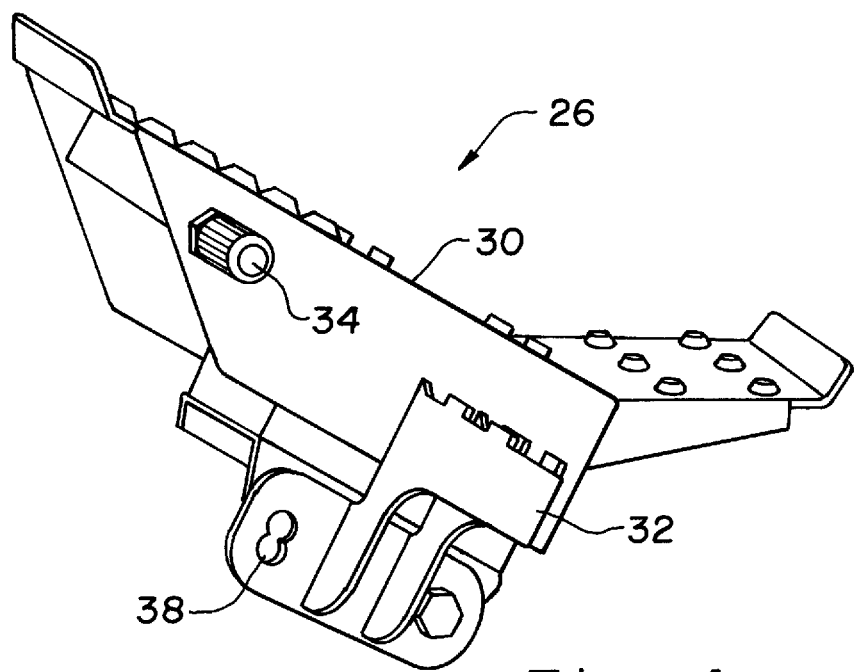
FIG. 4 is another view of the foot actuated control of FIGS. 2 and 3.

Referring now to the drawings, and more particularly to FIG. 1, there is illustrated a vehicle 10, which may be in the form of a feller/buncher used in the forestry industry utilized for the felling and bunching of trees. Vehicle 10 may also be considered an agricultural harvester, construction vehicle, military vehicle or other vehicle that is likely to encounter rough uneven off-road terrain. Vehicle 10 has a cab 12 and an undercarriage 14 that carries cab 12. Undercarriage 14 is connected to at least two ground engaging propulsion devices 16 for traversing the uneven ground. Ground propulsion devices 16 are illustrated as a tracked propulsion device driven by an engine, which is not separately identified, although wheels or other ground engaging devices are also contemplated. Boom 18 is located proximate to cab 12 having a harvesting head 20 on the end of boom 18. Harvesting head 20 includes a saw blade (or shears) and grappling arms for the grasping, cutting and placing of trees or other forestry type products in a desired location.

Now, additionally referring to FIGS. 2-6, there is illustrated a cab 12 having a seat 22 with hand actuated controls 24 proximate to seat 22. Foot activated controls 26 and 28 are mounted on a floor of cab 12 and each of foot actuated controls 26 and 28 include a pedal 30, a footrest 32 and a peg 34. Foot actuated controls 26 and 28 are operatively connected to ground engaging propulsion devices 16 with foot actuated control 26 operating one of the ground engaging propulsion devices 16 and foot actuated control 28 providing control of the other ground engaging propulsion device 16.

Foot actuated controls 26 and 28 each have a base 36 that is connected to the floor of cab 12. Pedals 30 pivot about an axis 42 that allows pedals 30 to rock back and forth thereby directing ground propulsion devices 16 in either a forward or a reverse direction as well as the extent of depression of pedal 30 controls the speed at which ground engaging propulsion devices 16 are commanded to move. Pedals 30 are centered by a biasing element such as springs, so that pedals 30 are self centering when no pressure is applied, which results in a command signal of no commanded movement.

Figure 5:
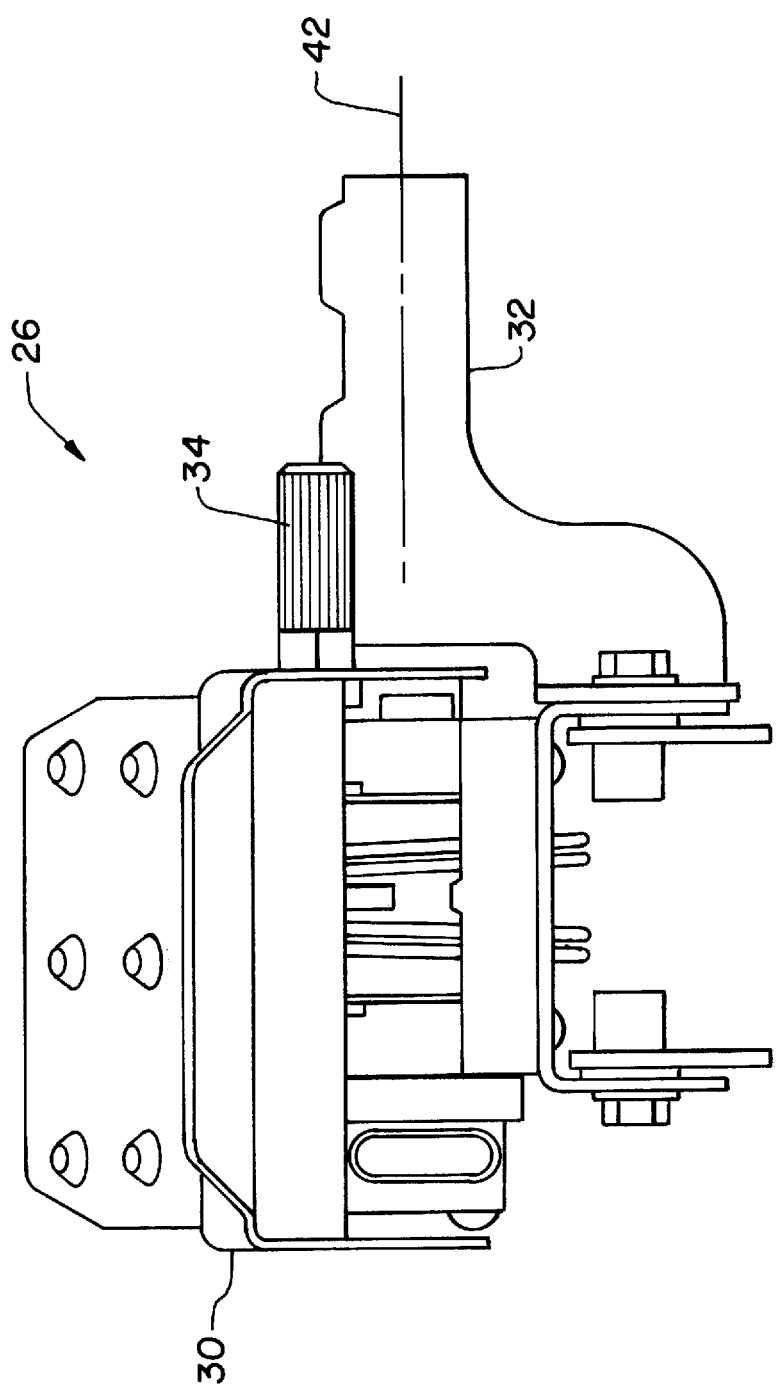
FIG. 5 is an end view of foot actuated control of FIGS. 2-4.
Figure 6:
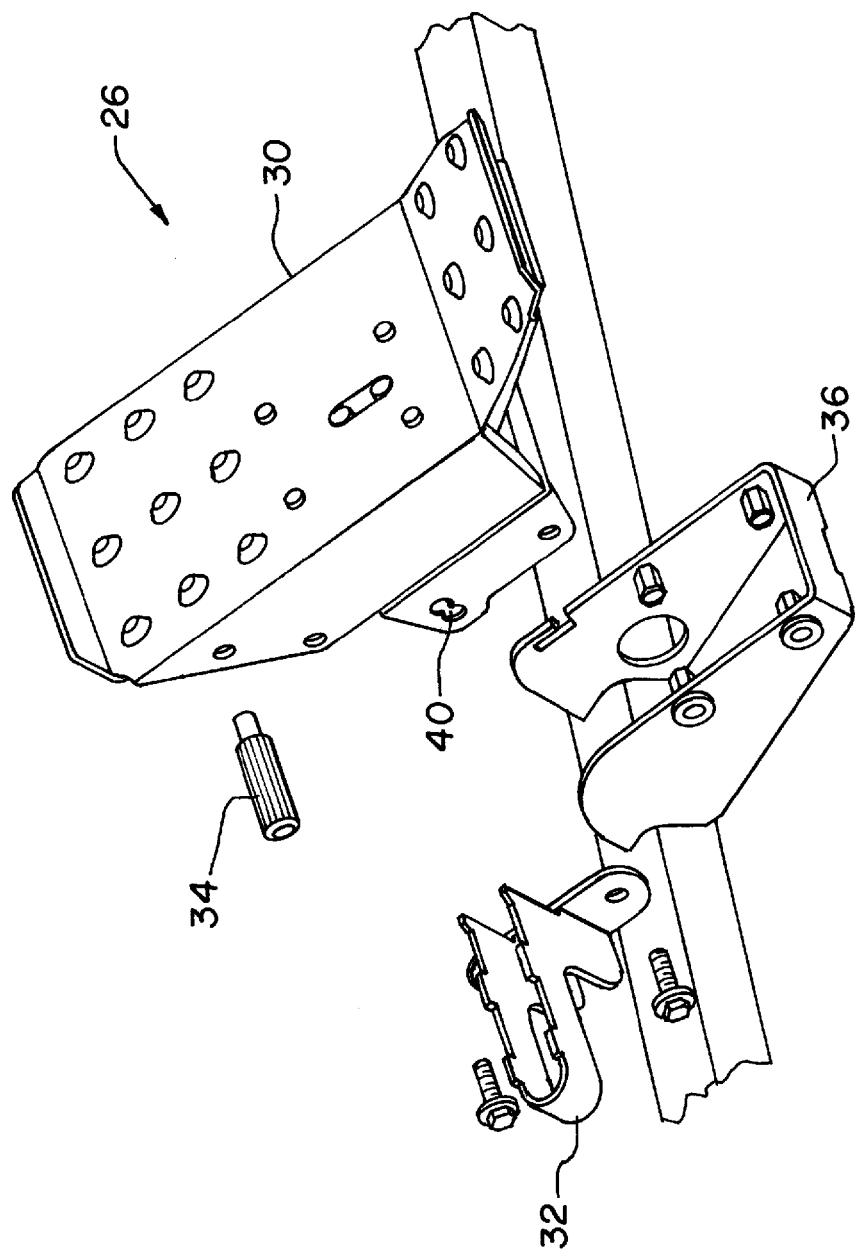
FIG. 6 is a partially exploded perspective view of the foot actuated control of FIGS. 2-5.

Footrest 32 may have adjacent intersecting holes 38 and corresponding adjacent intersecting holes 40 may be located on a portion of the pedal that interacts with base 36. Adjacent intersecting holes 38 and 40 allow for an adjustable inclination of pedal 30 and footrest 32 to accommodate the particular operator by inclination of pedals 30 and footrest 32 relative to a neutral or nonmoving position. Footrest 32 extends from base 36 and while shown as being connected thereto it is also contemplated that footrest 32 may be connected to a neutral portion of pedal 30. For purposes of illustration FIG. 4 does not show a bolt going through one of adjacent intersecting holes 38, although it is to be understood that a bolt does extend therethrough. Also, FIG. 3 does not show a bolt extending through the hole of footrest 32 to thereby illustrate an embodiment of the adjustable nature of footrest 32. Axis 42, about which pedal 30 pivots, extends through a portion of footrest 32 as illustrated in FIG. 5.

Footrest 32 and peg 34 extend in generally similar directions from foot actuated controls 26 and 28. Footrest 32 and peg 34 of foot actuated control 26 extend from an opposite direction of foot actuated control 26 as compared to footrest 32 and peg 34 of foot actuated control 28. Foot actuated controls 26 and 28 may be substantially mirror images of each other.

While operating vehicle 10, the feet of the operator are on pivoting pedals 30 and are subject to the movement of vehicle 10 over rough terrain causing an operator to potentially over extend the desired position on pedals 30, as vehicle 10 moves, potentially contributing to uneven or even undesirable motion of vehicle 10. To help alleviate stress to the operators feet and to help stabilize the movement of vehicle 10, the operator can place their feet beside pedal 30 upon footrest 32 to thereby stabilize the position of the feet and allow control of pedals 30 by placing the toe of the operator's shoe or foot upon peg 34 to control forward motion. Reverse motion can also be achieved by the operator placing their foot upon footrest 32 and the toe of their shoe underneath peg 34 to thereby lift pedal 30 causing a reverse direction. Advantageously weight applied by the operator to footrest 32 does not translate to motion of foot pedal 30 when this position is being utilized by the operator. Advantageously the operator can switch easily from utilizing footrest 32 and peg 34 to using pedal 30 when the terrain over which vehicle 10 is traversing changes.

Footrest 32 is bolted to base 36 and can be considered in a locked position. Footrest 32 coacts with peg 34 for the operation of pedal 30. Peg 34 may have a knurled surface to thereby enhance the gripping of the operator's shoe for the control of pedal 30.

Operators of vehicles such as vehicle 10 are generally exposed to long hours in the forestry equipment in which the movement of vehicle 10 contributes to fatigue and difficulty in operating the equipment in a precise manner. Footrest 32 gives the operator a stationary place to locate their feet and rest or brace their legs as needed in a comfortable position. Pegs 34 are located so that the operator may operate pedal 30 for forward travel while the foot pivots on footrest 32. The cantilever action from footrest 32 allows the operator to manipulate pedal 30 in a more precise manner and with less effort than primary usage area of pedal 30 in certain situations. This helps the operator to experience less fatigue and to be able to perform with greater efficiency, and to be able to vary the position of their feet.

A rocker sensor is positioned and connected to pedal 30 to provide a sensor signal for the control of vehicle 10. Pedal 30 is an ergonomic treadle plate having the side mounted footrest 32 and travel peg 34 connected thereto. Removable footrest 32 has a small profile that limits any visibility obstruction when not in use. An aggressive tread pattern on footrest 32 engages the foot of the operator during periods when travel is not required allowing comfortable and stable operating position, for example when the operator is operating boom 18 and harvesting head 20 while vehicle 10 is not moving. Footrest 32 additionally functions as a stabilization system during aggressive machine operation. The spatial relationship between pedal 30, peg 34 and footrest 32 are integral to allowing foot actuated controls 26 and 28 to function in a multipurpose roll. The relative orientation of footrest 32 and peg 34 allows for footrest 32 to be used without concern of accidental pedal activation and may act as a fulcrum located in the medial longitudinal arch of the foot allowing the operator to make forward tracking adjustments with greater precision and less effort than traditional pedal arrangements. The adjacent attachment of footrest 32 allows the operator to smoothly switch between traditional style pedal operation and the tracking peg 34 operation with minimal motion and effort. The resulting methodology of operation promotes incremental forward tracking only when using the tracking peg versus the conventional fore/aft pedal actuation of pedal 30. This operational method is conducive to reducing stress on machine components and the operator while minimizing visibility restrictions.

As an alternative footrest 32 can extend from the floor of cab 12 and other configurations are also contemplated.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A vehicle, comprising:
    a plurality of ground engaging propulsion devices including a first ground engaging propulsion device and a second ground engaging propulsion device, said first ground engaging propulsion device being associated with one side of the vehicle and said second ground engaging propulsion device being associated with an opposite side of the vehicle; and
    two foot actuated controls including a first foot actuated control and a second foot actuated control, said first foot actuated control being controlingly connected to said first ground engaging propulsion device, said second foot actuated control being controlingly connected to said second ground engaging propulsion device, said first foot actuated control having:
        a pedal pivotally connected to the vehicle;
        a footrest extending from a side of said first foot actuated control; and
        a peg extending from a side of said pedal.

2. The vehicle of claim 1, wherein said footrest and said peg extend in generally a similar direction.

3. The vehicle of claim 2, wherein said footrest is proximate to an axis about which said pedal pivots.

4. The vehicle of claim 3, wherein at least one of said footrest and said first foot actuated control have at least two adjacent intersecting holes, said footrest being connected to said first foot actuated control by at least two fasteners, one of said at least two fasteners coacting with one of said at least two adjacent intersecting holes to angularly adjust said footrest relative to said first foot actuated control.

5. The vehicle of claim 3, wherein said axis extends through said footrest.

6. The vehicle of claim 2, wherein said footrest is locked into position and does not move as said pedal pivots.

7. The vehicle of claim 1, wherein said second foot actuated control includes:
   a pedal pivotally connected to the vehicle;
   a footrest extending from a side of said second foot actuated control; and
   a peg extending from a side of said pedal of said second foot actuated control, wherein said first foot actuated control and said second foot actuated control are substantially mirror images of each other at least relative to said footrests and said pegs.

8. A control system for use in a vehicle having a plurality of ground engaging propulsion devices including a first ground engaging propulsion device and a second ground engaging propulsion device, said first ground engaging propulsion device being associated with one side of the vehicle and said second ground engaging propulsion device being associated with an opposite side of the vehicle, said control system comprising:
   two foot actuated controls including a first foot actuated control and a second foot actuated control, said first foot actuated control being controlingly connected to the first ground engaging propulsion device, said second foot actuated control being controlingly connected to the second ground engaging propulsion device, said first foot actuated control having:
      a pedal pivotally connected to the vehicle;
      a footrest extending from a side of said first foot actuated control; and
      a peg extending from a side of said pedal.

9. The control system of claim 8, wherein said footrest and said peg extend in generally a similar direction.

10. The control system of claim 9, wherein said footrest is proximate to an axis about which said pedal pivots.

11. The control system of claim 10, wherein at least one of said footrest and said first foot actuated control have at least two adjacent intersecting holes, said footrest being connected to said first foot actuated control by at least two fasteners, one of said at least two fasteners coacting with one of said at least two adjacent intersecting holes to angularly adjust said footrest relative to said first foot actuated control.

12. The control system of claim 10, wherein said axis extends through said footrest.

13. The control system of claim 9, wherein said footrest is locked into position and does not move as said pedal pivots.

14. The control system of claim 8, wherein said second foot actuated control includes:
   a pedal pivotally connected to the vehicle;
   a footrest extending from a side of said second foot actuated control; and
   a peg extending from a side of said pedal of said second foot actuated control, wherein said first foot actuated control and said second foot actuated control are substantially mirror images of each other at least relative to said footrests and said pegs.

15. A method of controlling movement of a vehicle, comprising the steps of:
   controlingly connecting a first foot actuated control to a first ground engaging propulsion device of the vehicle and a said second foot actuated control to a second ground engaging propulsion device of the vehicle, said first foot actuated control having:
      a pedal pivotally connected to the vehicle;
      a footrest extending from a side of said first foot actuated control; and
      a peg extending from a side of said pedal; and
   encountering a combination of said footrest and said peg by a foot of an operator to cause the vehicle to move.

16. The method of claim 15, wherein said footrest and said peg extend in generally a similar direction.

17. The method of claim 16, wherein said footrest is proximate to an axis about which said pedal pivots.

18. The method of claim 17, wherein said axis extends through said footrest.

19. The method of claim 16, wherein said footrest is locked into position and does not move as said pedal pivots.

20. The method of claim 15, wherein said second foot actuated control includes:
   a pedal pivotally connected to the vehicle;
   a footrest extending from a side of said second foot actuated control; and
   a peg extending from a side of said pedal of said second foot actuated control, wherein said first foot actuated control and said second foot actuated control are substantially mirror images of each other at least relative to said footrests and said pegs.

\* \* \* \* \*